United States Patent [19]
Palaniappan et al.

[11] Patent Number: 5,792,498
[45] Date of Patent: Aug. 11, 1998

[54] METHOD FOR PROCESSING A HOMOGENEOUS FOOD PRODUCT

[75] Inventors: Sevugan Palaniappan, Grayslake; Charles E. Sizer, Hawthorn Woods, both of Ill.; Rawn P. Walley, New Palestine, Ind.

[73] Assignee: Tetra Laval Holdings & Finance, S.A., Pully, Switzerland

[21] Appl. No.: 804,527

[22] Filed: Feb. 21, 1997

[51] Int. Cl.⁶ .......................................... A23L 3/00
[52] U.S. Cl. .......................... 426/520; 426/399; 426/511; 426/519
[58] Field of Search .................... 426/510, 511, 426/519, 520, 646, 399

[56] References Cited

U.S. PATENT DOCUMENTS

| | | | |
|---|---|---|---|
| 4,567,050 | 1/1986 | Roth | 426/520 |
| 4,637,936 | 1/1987 | White et al. | 426/523 |
| 5,080,164 | 1/1992 | Hermans | 426/521 |
| 5,261,282 | 11/1993 | Grabowski et al. | 426/231 |
| 5,294,452 | 3/1994 | De Francisci | 426/511 |

OTHER PUBLICATIONS

Establishing Aseptic Thermal Processes for Liquid Foods With Solid Particulates; Food Technology.
Thermal Processing Affects Properties of Commercial Shrimp and Scallops by Edgar Murakami.

*Primary Examiner*—George Yeung
*Attorney, Agent, or Firm*—Michael A. Catania

[57] ABSTRACT

A method for processing a food product is disclosed which overcomes problems associated with coagulation of food products (mostly meat products) undergoing aseptic processing. The method coagulates the food product prior to aseptic processing. The coagulated food product is then separated into smaller particles using various methods. The food product is then subjected to aseptic processing and packaging. The method is especially applicable to thawed meat products such as lamb or beef. The method allows for the aseptic shipment of food products to overseas markets where previously the food product had been frozen to prevent spoilage during shipment.

25 Claims, 5 Drawing Sheets

1

METHOD FOR PROCESSING A HOMOGENEOUS FOOD PRODUCT

BACKGROUND OF THE INVENTION

1. Field of the Invention

The present invention relates to a method for aseptically processing and packaging food. Specifically, the present invention relates to a method for aseptically processing and packaging a meat or fish product.

2. Description of the Related Art

The transportation of a food product from one location to another location presents a number of problems for a food processor. One major problem is the possibility of spoilage of the food product during transport. Another major problem is the cost of transportation of the food product, especially if the food product is frozen prior to shipment to prevent spoilage of the food product. Yet another major problem is processing the food product once it has arrived a food processor's plant.

These problems are further exaggerated when the food product is shipped overseas as is common in an intertwined global economy where the lowest cost producer may be an overseas entity. These problems are still further exaggerated when the food product is a meat product which has been frozen for shipment overseas to undergo aseptic processing for retail distribution. Frozen meat or fish requires an extended thawing period which degrades the microbiological and sensoric properties. The thawing also inconveniences the food processing plant and requires special equipment. A particular problem with a meat product undergoing aseptic processing is the tendency for the meat product to coagulate while undergoing the aseptic processing thereby clogging the machinery and preventing the processing of the meat product. This problem of coagulation is a serious detriment the meat processing industry if left unresolved would lessen the purchase of a meat product from the lowest cost producer.

BRIEF SUMMARY OF THE INVENTION

The present invention is a novel solution to these unresolved problems of the food processing industry. Also, the present invention is a specific solution to the problem of a meat product coagulating during aseptic processing. The present invention would allow the meat product to be shipped at ambient temperature when the meat product is transported overseas.

One aspect of the present invention is a method for creating a pumpable homogenous meat product for aseptic processing. The method commences with the step of providing a homogenous meat product. The next step is placing the homogenous meat product into a coagulator. The next step is coagulating the homogenous meat product through injecting steam into the coagulator and heating the product to a temperature in excess of 90° C. to create a coagulated meat product. The next step is emulsifying the coagulated meat product in an emulsifier to form an emulsified meat product and to emulsify fat associated with the coagulated meat product. The next step is blending the emulsified meat product in a kettle to create a pumpable homogenous meat product for aseptic processing. The steps of coagulating, emulsifying and blending prevents the pumpable homogenous meat product from coagulating during aseptic processing.

Another aspect of the present invention is a method for aseptically processing a homogenous food product. The method commences with the step of providing a homogenous food product to be aseptically processed. The next step is coagulating the food product in the coagulator to form a coagulated food product. The next step is emulsifying the coagulated food product in an emulsifier to form an emulsified food product. The next step is blending the emulsified food product in a kettle to create a pumpable food product. The final step is aseptically processing the pumpable food product through a plurality of heat exchangers to create an aseptically processed food product.

Still another aspect of the present invention is a method for aseptically processing a homogenous meat product. The method commences with the step of providing a homogenous meat product to be aseptically processed. The next step is coagulating the meat product in a coagulator to create a coagulated meat product. The next step is emulsifying the coagulated meat product in an emulsifier to form an emulsified meat product and to emulsify fat associated with the coagulated meat product. The next step is blending the emulsified meat product in a kettle to create a pumpable meat product. The next step is aseptically processing the pumpable meat product through a plurality of heat exchangers to create an aseptically processed meat product. A final step may be aseptically packaging the aseptically processed meat product.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

Several features of the present invention are further described in connection with the accompanying drawings in which:

There is illustrated in FIG. 1 a schematic diagram of a system for performing the method of the present invention.

Figure 2:
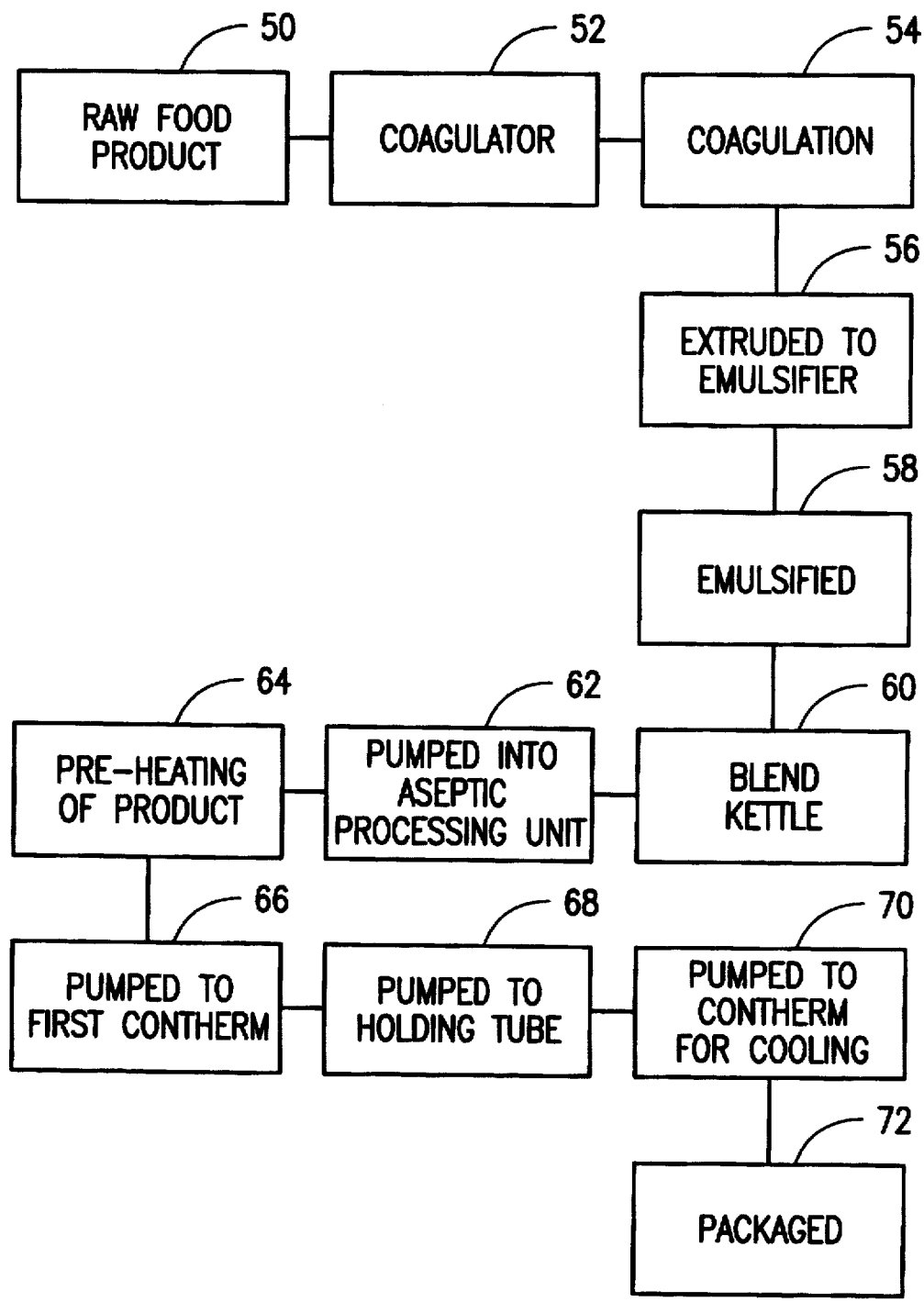

There is illustrated in FIG. 2 a flow chart of a preferred embodiment of the method of the present invention.

Figure 3:
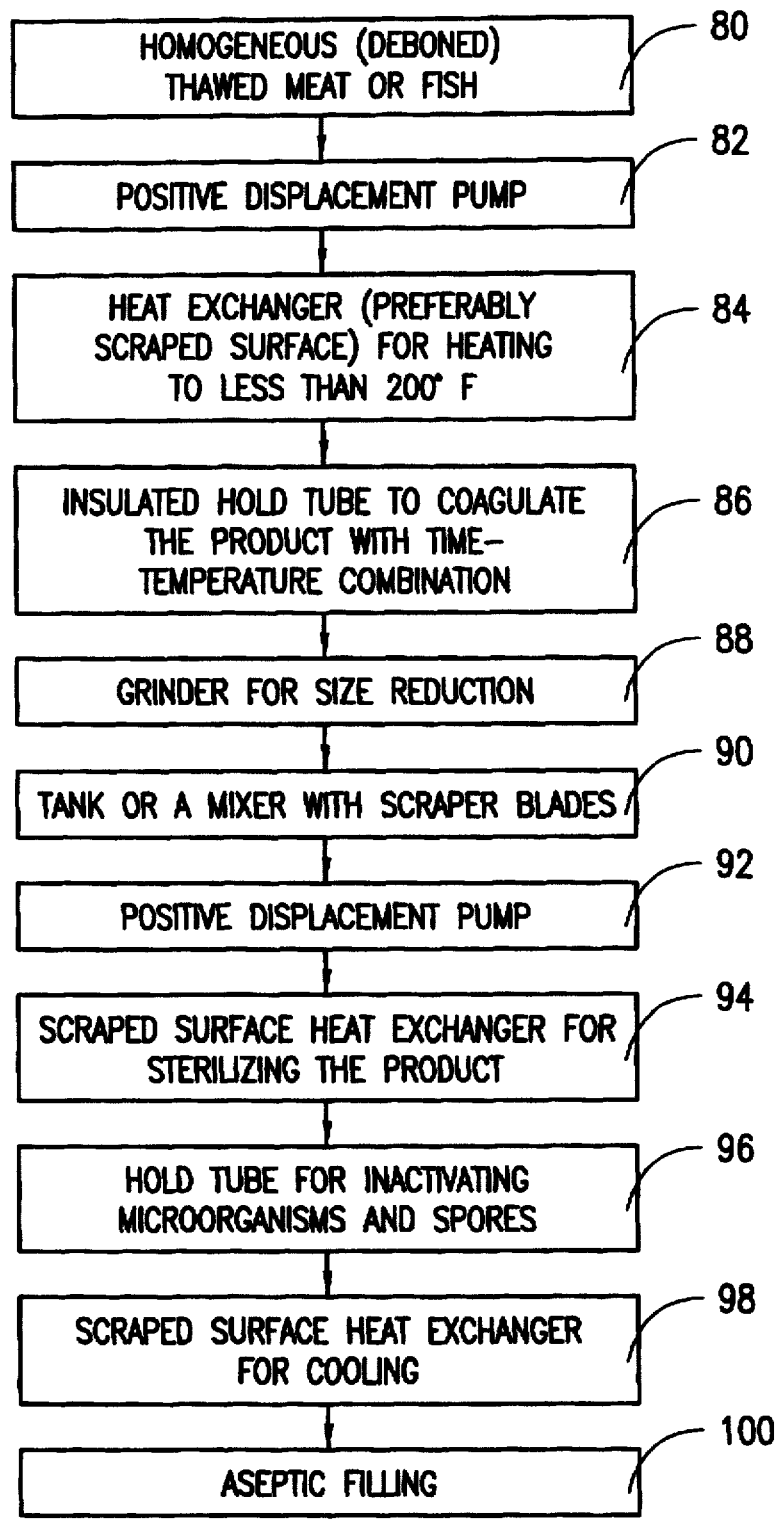

There is illustrated in FIG. 3 a flow chart of an alternative embodiment of the method of the present invention.

Figure 4:
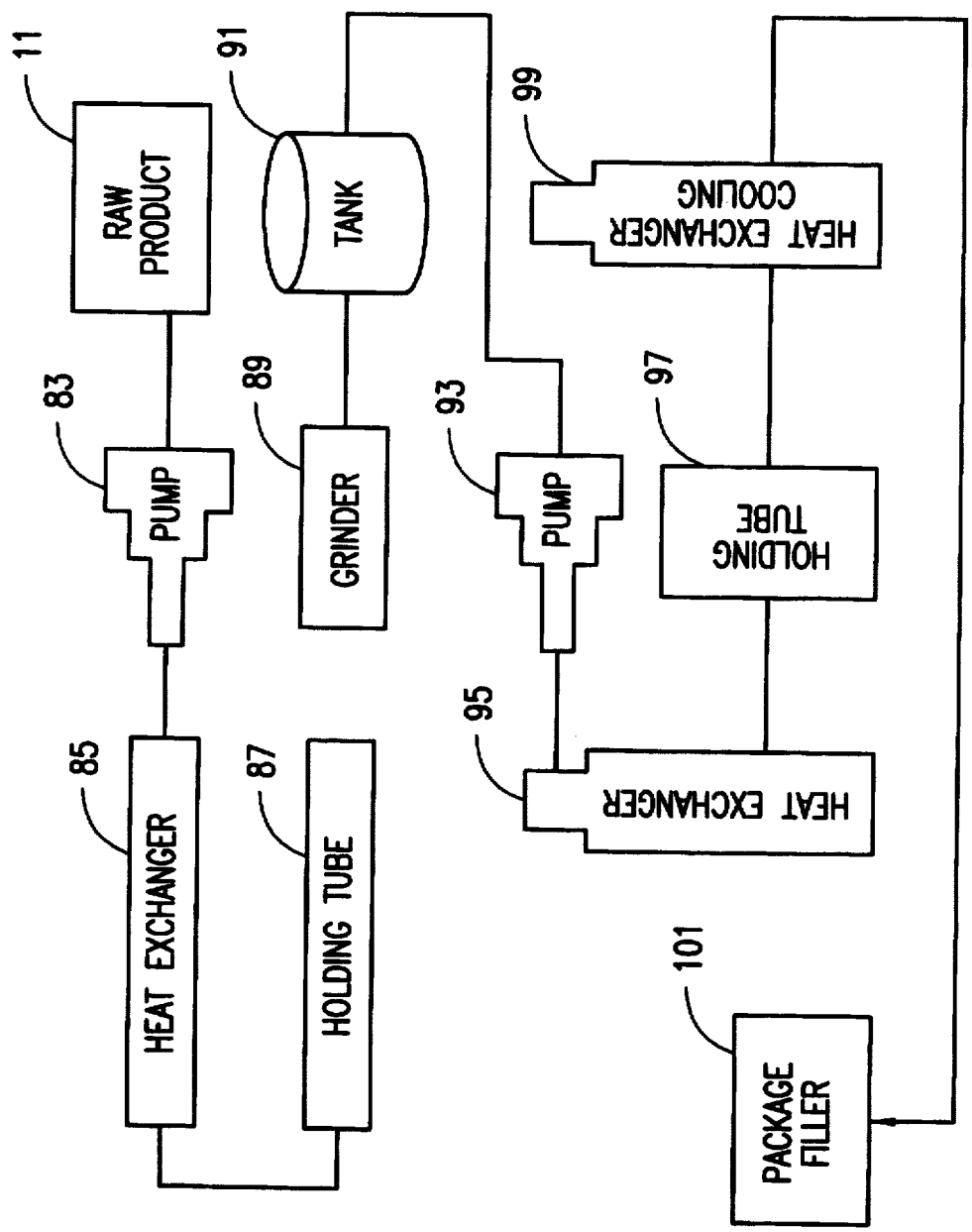

There is illustrated in FIG. 4 a schematic diagram of an alternative system for performing the method of FIG. 3.

Figure 5:
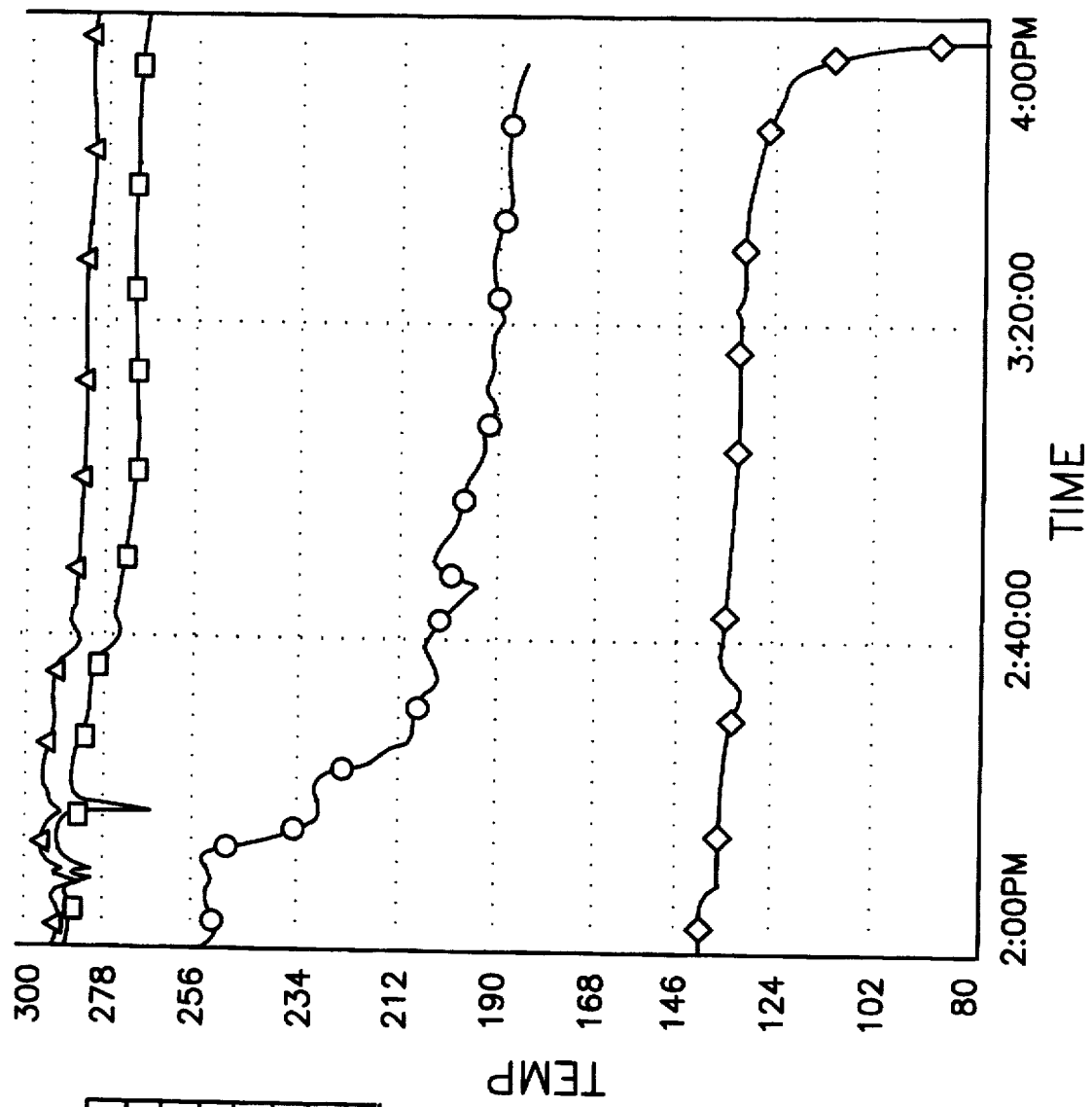

There is illustrated in FIG. 5 a graph of the temperature curves for the product of example one.

DETAILED DESCRIPTION OF THE INVENTION

Figure 1:
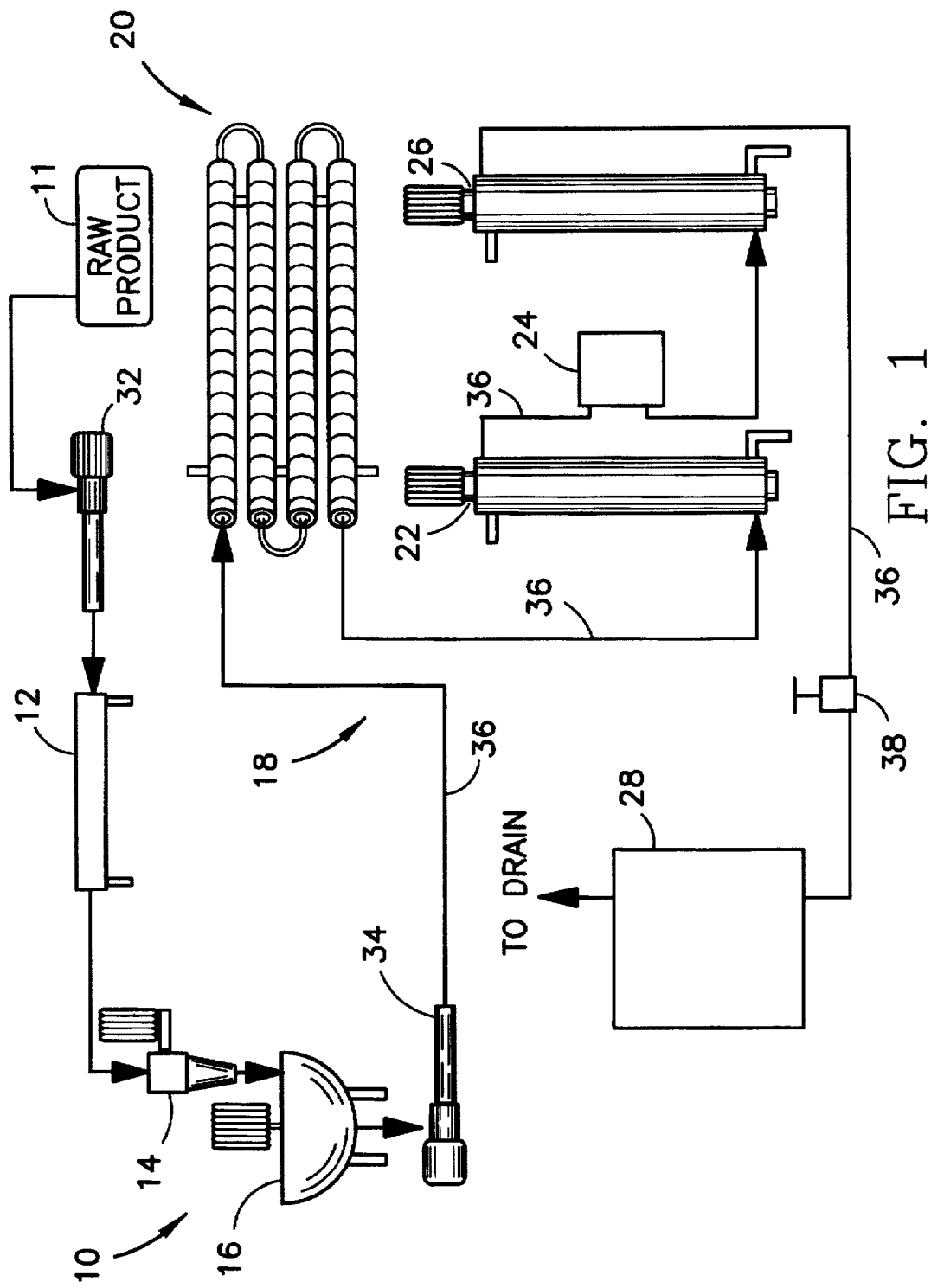

There is illustrated in FIG. 1 a schematic diagram of a system for performing the method of the present invention. There is illustrated in FIG. 2 a flow chart of a preferred embodiment of the method of the present invention. As shown in FIG. 1, the system 10 is generally composed of a coagulator 12, emulsifier 14, blend kettle 16 and aseptic processing unit 18. The aseptic processing unit 18 further includes a plurality of heat exchangers 20, a first contherm unit 22, a holding tube 24, a second contherm unit 26 and a packaging filler 28. The system 10 is utilized in performing the method of the present invention as set forth in the flow chart of FIG. 2. However, those skilled in the pertinent art will readily recognize that other systems may be employed in practicing the method of the present invention without departing from the scope and spirit of the present invention.

Referring to FIGS. 1 and 2, at step 50, a food product 11 is provided for aseptic processing. The food product 11 may be fresh or a thawed food product. In a preferred application, the food product 11 is a homogenous meat product, preferably lamb or beef. However other food products such as fish, chicken, turkey, venison, horse, bison, goat, alligator or the like are within the scope of the present invention.

At step 52, the food product 11 is placed in the coagulator 12 via a first progressive cavity pump 32. A useful coagulator 12 is an ALFA-LAVAL® RMH available from Alfa-Laval® of Wisconsin. At step 54, the food product 11 is coagulated in the coagulator 12. Coagulation of the food product 11 may be performed by pressurizing the coagulator 12 with steam at a pressure of 40 psi, and by heating the coagulator 12 to a temperature of at least 80° C., and preferably 93.4° C. (200° F.). While in the coagulator, the food product 11 will coagulate thereby greatly decreasing the possibility of the food product 11 coagulating during the aseptic processing of the food product 11. The food product 11 is formed into a coagulated food product 11.

At step 56, the coagulated food product 11 is extruded into the emulsifier 14. A useful emulsifier 14 is a Stephan emulsifier. At step 58, the coagulated food product 11 is emulsified into an emulsified food product 11. The emulsifier 14 increases the surface area of fat components associated with the food product 11. In meat products such as lamb or beef, the emulsifier 14 will greatly increase the surface area of the fat components. The surface area of the fat components is increased through separating the fat components into a plethora of fat particles which greatly enhances the pumpability of the food product 11. Also at step 56, an emulsified food product 11 is created from the coagulated food product 11.

At step 60, the emulsified food product 11 is placed into the blend kettle 16. This may be accomplished through gravity feeding the emulsified food product 11 into the blend kettle 16. Preferably, the blend kettle 16 may contain upwards of 1135.5 liters (300 gallons). At step 60, the emulsified food product 11 is blended in the blend kettle 16. Also at step 60, a pumpable food product 11 is created from the emulsified food product 11. The pumpable food product 11 is separated into a multitude of smaller particles which are substantially resistant to recoagulating during the aseptic processing.

At step 62, the blended food product 11 is pumped into the aseptic processing unit 18 via a second progressive cavity pump 34. At step 64, the pumpable food product 11 is pre-heated in a series of heat exchangers 20 which are preferably tubular heat exchangers. From the second progressive cavity pump 34 to the series of heat exchangers 20, the pumpable food product has a median temperature of 65.5° C. (150° F.). In the series of tubular heat exchangers, the temperature of the pumpable food product is raised to 93.4° C. (200° F.). The entire aseptic processing unit 18 is in flow communication through a plurality of conduits 36 which connect the major components of the aseptic processing unit 18. At step 66, the pumpable food product 11 pumped via a conduit 36 to a first contherm 22 where the pumpable food product 11 is heated to a temperature of at least 133° C. (272° F.).

At step 68, the pumpable food product 11 is pumped to a holding tube 24 and held within the holding tube 24 for a minimum of 20 seconds to ensure a sufficient kill of microorganism which may cause spoilage of the pumpable food product 11. At step 70, the pumpable food product 11 is pumped to a second contherm 26 for cooling. At step 72, the pumpable food product 11 is pumped to a packaging filler 28 for aseptic packaging. From the second contherm 26 to the packaging filler 28, the pumpable food product has an approximate temperature of 32°–44° C. (90°–110° F.). Also, between the second contherm 26 and the packaging filler 28, there is a back pressure valve 38 to assist in pressure control of the aseptic processing unit 18.

Referring again to step 68, the food product 11 must be subjected to a sufficient amount of heating to kill the microorganisms. The amount of heating necessary is measured as accumulated lethality which is a function of the actual temperature, a reference temperature and the holding time. The equation for measuring accumulated lethality is as follows:

$$F_o = 10^{(T-TR/z)} \cdot t$$

$F_o$=accumulated lethality
T=actual temperature
TR=reference temperature
*t=holding time
z=degrees Celsius factor Using 121° C. as the reference temperature, the accumulated lethality, $F_o$, should a value of 5.0 minutes. Accumulated lethality is measured in units of "minutes", however, these units do not correspond to the common definition of minutes as a measurement of time. The 5.0 minutes of accumulated lethality may be obtained through either varying the actual temperature or the time.

There is illustrated in FIG. 3 a flow chart of an alternative embodiment of the method of the present invention. There is illustrated in FIG. 4 a schematic diagram of an alternative system for performing the method of FIG. 3. Referring to FIGS. 3 and 4 in combination, at step 80, a homogenous food product 11 is provided. The food product 11 may be a meat or fish, either thawed or fresh. At step 82, the food product 11 is placed into a positive displacement pump 83. At step 84, the food product 11 is pumped to a series of heat exchangers 85 for heating the food product to a temperature of less than 93.4° C. (200° F.). At step 86, the heated food product 11 is pumped to a holding tube 87 to coagulate the food product 11 with a time and temperature combination depending on the food product 11. At step 86, a coagulated food product 11 is created in the holding tube 87.

At step 88, the coagulated food product 11 is pumped to a grinder 89 for size reduction. A grinded food product 11 is created in the grinder. At step 90, the grinned food product 11 is placed in a tank or mixer having scraper blades 91 to create a pumpable food product 11 for aseptic processing.

At step 92, the pumpable food product is placed in a second positive displacement pump 93 and pumped to a heat exchanger 95 for sterilization at step 94. The heat exchanger 95 is preferably a scraped surface heat exchanger. For example, at step 94, if the food product 11 is lamb meat it is heated to 133° C. (272° F.) inside the heat exchanger 95. At step 96, the food product is placed into a holding tube 97 for inactivating the microorganisms and spores. For example, in order to obtain the minimum accumulated lethality of 5.0 minutes for lamb meat at a temperature of 133° C., the food product is held in the holding tube 97 for 20 seconds. However, those skilled in the pertinent art will recognize that other combinations of temperature and time may be utilized to obtain the minimum accumulated lethality.

At step 98, the food product 11 is pumped to a heat exchanger 99 for cooling and then at step 100 it is aseptically packaged in a package filler 101. At step 98, a scraped surface heat exchanger is preferred.

The present invention will be described in the following examples which will further demonstrated the efficacy of the novel method, however, the scope of the present invention is not to be limited by these examples.

EXAMPLE ONE

With reference to Table 1, the food product 11 was thawed lamb meat which was mechanically deboned prior to overseas shipment from New Zealand. The actual temperature was 133° C. (272° F.). The hold time was 20 seconds thereby obtaining an accumulated lethality of 5.0 minutes.

Two 2000 pound containers of refrigerated raw lamb were received for processing. The raw lamb was directly fed into an Alfa Laval® coagulator by means of a PCM progressive cavity pump. The steam supply pressure to the coagulator was 40 psi. In the coagulator, the lamb was pre-heated to 200° F. by direct steam injection and extruded into an emulsifier. From the emulsifier, the product was gravity fed into a 300 gallon steam kettle and continually mixed. When the product level reached 150 gallons, the blend kettle outlet valve was opened for aseptic processing.

A full size tubular and scraped surface heat exchange system was utilized for thermal processing of the lamb. The processing system consisted of a Tetra Pak® Spriaflo two foot tubular heat exchangers and two contherm scraped surface heat exchangers. A PCM progressive cavity pump was used as a feed pump, the tubes were used as preheaters, one contherm as a final heater and another as a cooler. A twelve foot hold tube having a diameter of 2 inches was used to obtain the minimum lethality required to produce a commercially sterile product. A data acquisition system was used to acquire the information in table 1 and FIG. 5 presents the product temperature curves.

A Star Asept bag-in-box type aseptic filler was used for filling the processed product in 25 pound bags. The machine was presterilized using hot water at 250° F. for 30 minutes. Particulate valve and chamber were used for this product. A condensate flush was used to clean the spouts. The spouts were sterilized at 280° F. for 20 seconds. The packaging material consisted of foil barrier bags.

I claim as my invention:

1. A method for aseptically processing a homogenous food product, the method comprising the steps of:
   providing a homogenous food product to be aseptically processed;
   coagulating the food product in a coagulator to form a coagulated food product;
   emulsifying the coagulated food product in an emulsifier to form an emulsified food product;
   blending the emulsified food product in a kettle to create a pumpable food product; and
   aseptically processing the pumpable food product through a plurality of heat exchangers to preheat the food product to a predetermined temperature sufficient to create an aseptically processed food product.

2. The method according to claim 1 wherein the step of coagulating comprises the steps of pressurizing the coagulator and heating the coagulator to a temperature of least 80° C.

3. The method according to claim 2 wherein the step of heating the coagulator is accomplished through steam injected into the coagulator.

4. The method according to claim 1 further comprising the step of aseptically packaging the aseptically processed food product.

5. The method according to claim 1 wherein the step of aseptically processing the pumpable food product comprises subjecting the pumpable food product to an accumulated lethality of at least 5.0 minutes.

6. The method according to claim 1 wherein the food product is a thawed food product.

7. A method for aseptically processing a homogenous meat product, the method comprising the steps of:
   providing a homogenous meat product to be aseptically processed;
   coagulating the meat product in a coagulator to create a coagulated meat product;
   emulsifying the coagulated meat product in an emulsifier to form an emulsified meat product and to emulsify fat associated with the coagulated meat product;

TABLE 1

| Test Run | Product | Product Flow Rate (GPM) | Temperature °F. | | | | | | | |
|---|---|---|---|---|---|---|---|---|---|---|
| | | | Preheater | | Final Heater | | Hold Tube | | Cooler | |
| | | | in | out | in | out | in | out | in | out |
| 1 | Lamb | 2.6 | 140 | 203 | 203 | 280 | 280 | 275 | 275 | 90–110 |

Sterilization Temperature: 272° F.
Hold Tube Volume: 1.75 gal
Minimum Hold Time: 20 sec
Min. Lethality Reqd: 5.0 min From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims:

blending the emulsified meat product in a kettle to create a pumpable meat product; and
aseptically processing the pumpable meat product through a plurality of heat exchangers to preheat the pumpable meat product to a predetermined temperature sufficient to create an aseptically processed meat product.

8. The method according to claim 7 wherein the step of coagulating comprises the step of pressurizing the coagulator and heating the coagulator to a temperature of at least 70° C.

9. The method according to claim 8 wherein the step of heating the coagulator is accomplished through steam injected into the coagulator.

10. The method according to claim 7 further comprising the step of aseptically aging the aseptically processed meat product.

11. The method according to claim 7 wherein the step of aseptically processing the pumpable meat product comprises subjecting the pumpable meat product to a temperature of at least 133° C. for a time period of at least 20 seconds.

12. The method according to claim 7 wherein the meat product is a thawed meat product.

13. A method for creating a pumpable homogenous meat product for aseptic processing, the method comprising the steps of:

providing a homogenous meat product;

placing the homogenous meat product into a coagulator;

coagulating the homogenous meat product through pressurizing the coagulator and heating the coagulator to a temperature in excess of 90° C. to create a coagulated meat product;

emulsifying the coagulated meat product in an emulsifier to form an emulsified meat product and to emulsify fat associated with the coagulated meat product; and blending the emulsified meat product in a kettle to create a pumpable homogenous meat product for aseptic processing;

whereby the steps of coagulating, emulsifying and blending prevents the pumpable homogenous meat product from coagulating during aseptic processing wherein the pumpable food product is heated and maintained at a predetermined temperature for a predetermined time period.

14. The method according to claim 13 further comprising the step of aseptically processing the pumpable homogenous meat product by heating the pumpable food product to a predetermined temperature and maintaining the pumpable food product at the predetermined temperature for a predetermined time period.

15. The method according to claim 13 wherein the coagulator is pressurized to at least 40 psi.

16. The method according to claim 13 wherein the homogenous meat product is a thawed meat product.

17. The method according to claim 14 wherein the pumpable homogenous meat product is heated to a temperature of at least 133° C. for a minimum time period of 20 seconds.

18. The method according to claim 13 wherein the homogenous meat product is selected from the group consisting of lamb, horse and beef.

19. The method according to claim 14 further comprising the step of aseptically packaging the aseptically processed meat product.

20. The method according to claim 14 wherein the meat product is subject to an accumulated lethality of at least 5.0 minutes during the aseptic processing.

21. A method for creating a pumpable homogenous food product for aseptic processing, the method comprising the steps of:

providing a homogenous food product;

heating the homogenous food product to a temperature less than 94° C. to create a heated food product;

placing the heated food product into a coagulator;

coagulating the heated food to create a coagulated food product;

grinding the coagulated food product in a grinder to form a grinned food product; and blending the grinned food product in a mixer to create a pumpable food product for aseptic processing;

whereby the steps of coagulating, grinding and blending prevents the pumpable food product from coagulating during aseptic processing wherein the pump able food product is heated and maintained at a predetermined temperature for a predetermined time period.

22. The method according to claim 21 further comprising the step of aseptically processing the pumpable food product by heating the pumpable food product to a predetermined temperature and maintaining the pumpable food product at the predetermined temperature for a predetermined time period.

23. The method according to claim 21 wherein the homogenous food product is selected from the group consisting of lamb, horse and beef.

24. The method according to claim 22 further comprising the step of aseptically packaging the aseptically processed meat product.

25. The method according to claim 22 wherein the pumpable food product is subject to an accumulated lethality of at least 5.0 minutes during the aseptic processing.

* * * * *